United States Patent [19]
Watanabe et al.

[11] Patent Number: 5,358,271
[45] Date of Patent: Oct. 25, 1994

[54] STRUCTURE FOR ATTACHING A MODULE COVER OF AN AIR BAG DEVICE FOR A PASSENGER

[75] Inventors: Kazuo Watanabe; Takayasu Zushi, both of Shiga, Japan

[73] Assignee: Takata Corporation, Tokyo, Japan

[21] Appl. No.: 29,574

[22] Filed: Mar. 11, 1993

[30] Foreign Application Priority Data

Mar. 25, 1992 [JP] Japan .................. 4-67194

[51] Int. Cl.⁵ ............................................. B60R 21/20
[52] U.S. Cl. .................................................. 280/728 B
[58] Field of Search .......... 280/728 R, 728 A, 728 B, 280/730 R, 731, 732, 743 R

[56] References Cited

U.S. PATENT DOCUMENTS 4,893,833  1/1990  DiSalvo et al. .............. 280/732
4,895,389  1/1990  Pack, Jr. ..................... 280/728 B
4,989,896  2/1991  DiSalvo et al. .............. 280/728 B
5,002,307  3/1991  Heidorn ....................... 280/731
5,066,037  11/1991 Castrigno et al. .
5,096,221  3/1992  Combs et al. .

FOREIGN PATENT DOCUMENTS 0358230  3/1990  European Pat. Off. .

Primary Examiner—Karin L. Tyson
Attorney, Agent, or Firm—Kanesaka & Takeuchi

[57] ABSTRACT

In a module cover attaching structure of an air bag device for a passenger, a module cover is attached to a casing accommodating an air bag in a folded form, and an attachment piece provided at a rear surface of the module cover is attached to the casing. The attachment piece provided at a front edge, in a longitudinal direction of a vehicle, of the casing has at least one bendable portion.

5 Claims, 4 Drawing Sheets

STRUCTURE FOR ATTACHING A MODULE COVER OF AN AIR BAG DEVICE FOR A PASSENGER

FIELD OF THE INVENTION

The present invention relates to an air bag device for a passenger disposed in an instrument panel in front of a passenger's seat in an automobile, and in particular, it relates to an improvement of a structure for attaching a module cover to a casing.

DESCRIPTION OF THE RELATED ART

In such an air bag device for a passenger, an air bag and an inflator are attached to a casing or a container having an opening which is covered with a module cover attached thereto. The module cover is also referred to as a lid, a cover door or a development door in some cases. Upon collision of a vehicle, the inflator acts to develop the air bag, which in turn pushes and opens the module cover toward a cabin or interior space of the vehicle, and thus the air bag develops largely into the cabin.

A structure and an operation of the air bag device for the passage in the prior art will be schematically described below with reference to FIGS. 4–6.

FIG. 5 is a schematic perspective view of the air bag device for the passage in the prior art, FIG. 4 is a cross section taken along line IV—IV in FIG. 5, and FIG. 6 is a schematic view for showing an operation. An air bag device 10' for a passenger includes a casing 12' which accommodates an air bag 14' in a folded form. In the casing 12', there is provided an inflator 16' for developing the air bag 14'. The casing 12' is provided at its front or upper side with an opening which opens toward a cabin of a vehicle. This opening is covered with a plate of a module cover 18'. This plate of the module cover 18' is formed of a main body 18'a made of synthetic resin and a reinforcement plate 18'b which is made of metal and is disposed in (or at the rear side) of the body 18'a. Numeral 20' is an opening which is provided in an instrument panel 22' of the vehicle for attaching the air bag device.

In order to attach the module cover 18' to the casing 12', the module cover 18' is provided at the opposite side edges of its rear surface with attachment pieces 24' and 26' projected therefrom. The attachment pieces 24' and 26' are integrally formed of the synthetic resin of the main body 18'. These attachment pieces 24' and 26' are fixed to the casing 12' by rivets or bolts 28' and 30'. As will be described later, when the module cover 18' is pushed by the developing air bag 14', the attachment piece 24' is disengaged from the rivet or bolt 28'. When the module cover 18' starts to open as indicated by an arrow B, the attachment piece 26' bends into a curved form as indicated by an arrow A of alternate long and two short dashes in FIG. 4. The attachment piece 26' is located at a front position in view of a longitudinal direction of the vehicle, and the attachment piece 24' is located at a rear position in view of the same direction.

Upon collision of the vehicle equipped with this air bag device 10', the inflator 16' operates to inflate the air bag 14', which in turn pushes the module cover 18'. Thereby, the module cover 18' starts to open in a door-like fashion, as shown in FIG. 6. Thereby, the air bag 14' develops largely into the cabin of the vehicle.

In the foregoing structure for attaching the module cover of the air bag device for the passenger in the prior art, the module cover 18' opens as shown in FIG. 6 mainly by virtue of deformation of the attachment piece 26' when the air bag 14' is opened. Since the attachment piece 26' is made of a flat plate, a large force is required to bend and deform the same. This requires a higher pressure of gas generated by the inflator 16'.

OBJECT AND SUMMARY OF THE INVENTION

Accordingly, it is an object of the invention to provide a module cover attaching structure of an air bag device for a passenger, overcoming the above-noted disadvantages, in which an attachment piece can be deformed by a small force, and thus a module cover can be opened quickly.

The invention provides a module cover attaching structure of an air bag device for a passenger, wherein a module cover is attached to a casing accommodating an air bag in a folded form, and an attachment piece provided at a rear surface of the module cover is attached to the casing, wherein the attachment piece provided at a front edge, in a longitudinal direction of a vehicle, of the casing has at least one bendable portion.

In the module cover attaching structure of the air bag device for the passenger, the attachment piece can be bent at multiple points, so that the module cover starts to open even by a weak force.

DETAILED DESCRIPTION OF THE PREFERRED EMBODIMENTS

Figure 1:
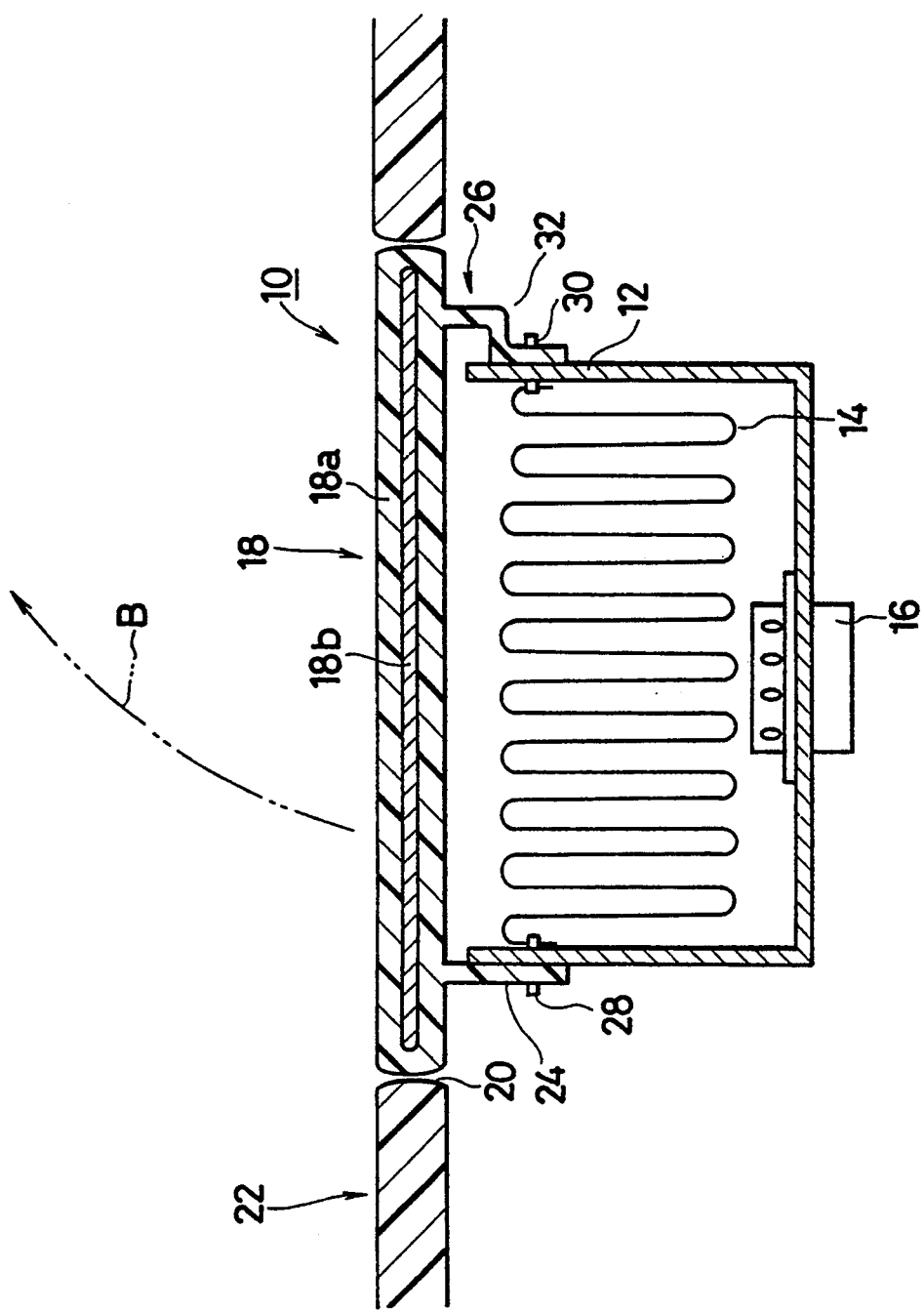
FIG. 1 is a cross section showing a structure of an embodiment of the invention.
Figure 4:
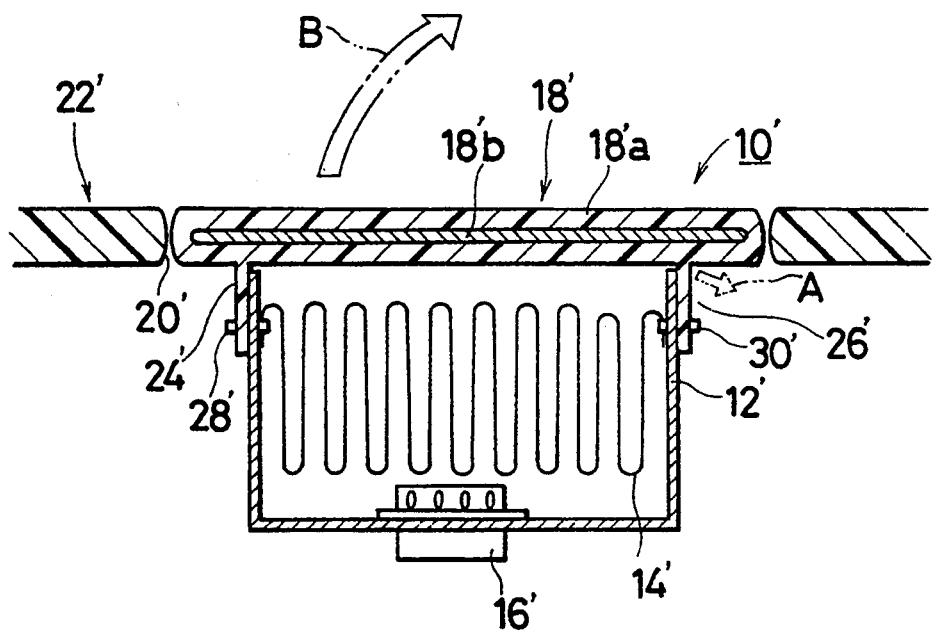
FIG. 4 is a cross section showing a prior art.
Figure 5:
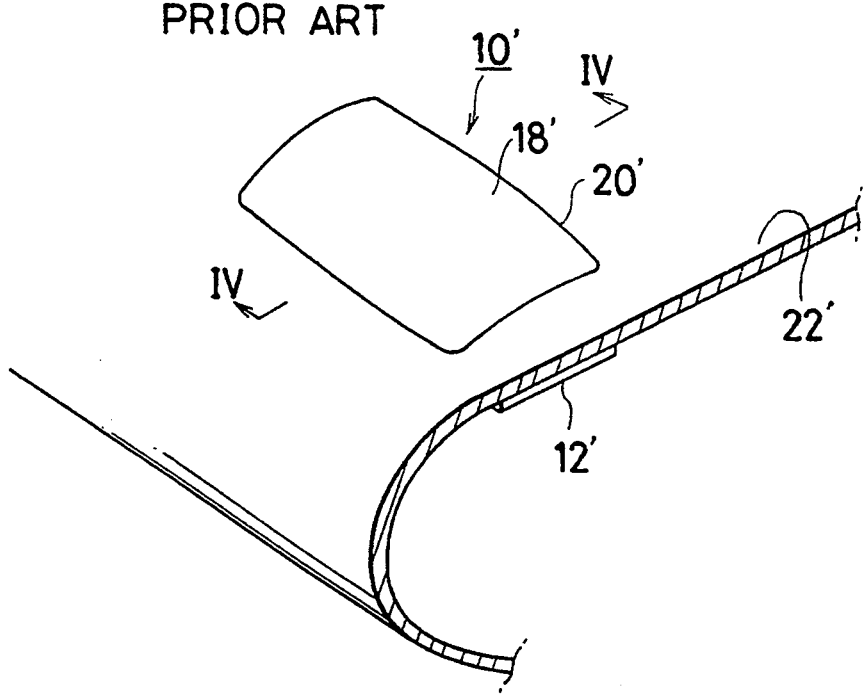
FIG. 5 is a perspective view showing a prior art.
Figure 6:
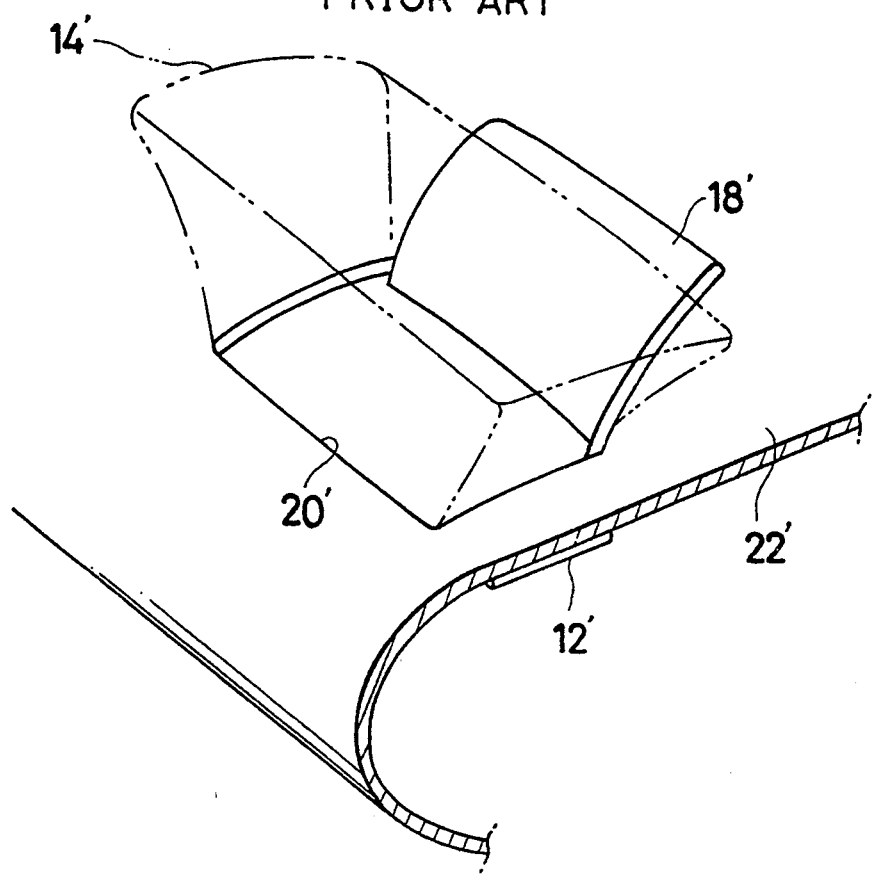
FIG. 6 is a perspective view showing an operating state of the prior art.

Embodiments of the invention will be described below with reference to the drawings. FIG. 1 is a cross section showing a module cover attaching structure of an embodiment of the invention. In this embodiment, an attachment piece 26 is provided at its one portion with a bendable portion 32 having an L-shaped section. Other structures are similar to those in FIG. 4. The similar structures and portions bear the same reference numerals without primes and will not be described below.

In the module cover attaching structure of the invention, an inflator 16 operates to develop an air bag 14, which in turn pushes a module cover 18 to open the same as indicated by an arrow B in FIG. 1. In this operation, since the attachment piece 26 has the bendable portion 32, it facilely deforms, and thus a module cover 18 opens at a higher speed. Therefore, the air bag 14 can quickly develops into a cabin of the vehicle. A gas generating pressure of the inflator 16 can be small, and thus the inflator 16 can be inexpensive.

In the foregoing embodiment, the attachment piece 26 is provided at its one portion with the bendable portion 32. In the invention, however, the attachment piece 26 may be provided at its two portions with the bendable portions 32, as shown in FIG. 2, or may be provided at its three portions with bendable portions, although not shown.

Figure 3:
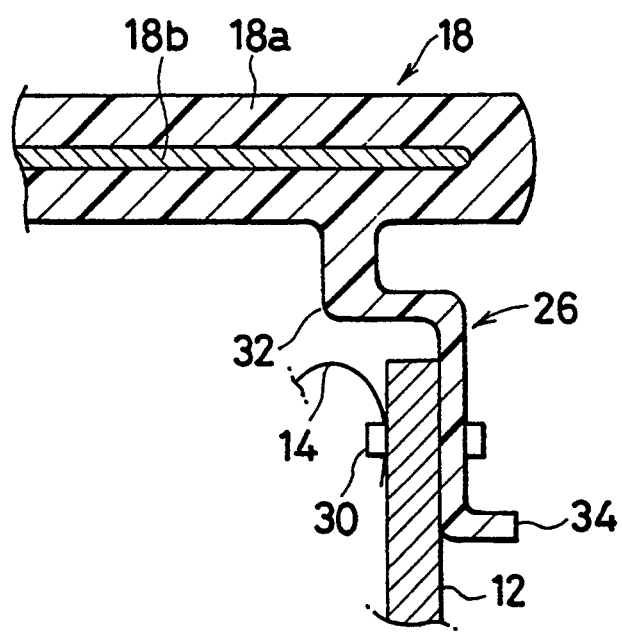
FIG. 3 is a cross section showing a major part of a structure of still another embodiment of the invention.

Further, in the invention, the bendable portion 32 may be protruded into the casing 12, as shown in FIG. 3.

Figure 2:
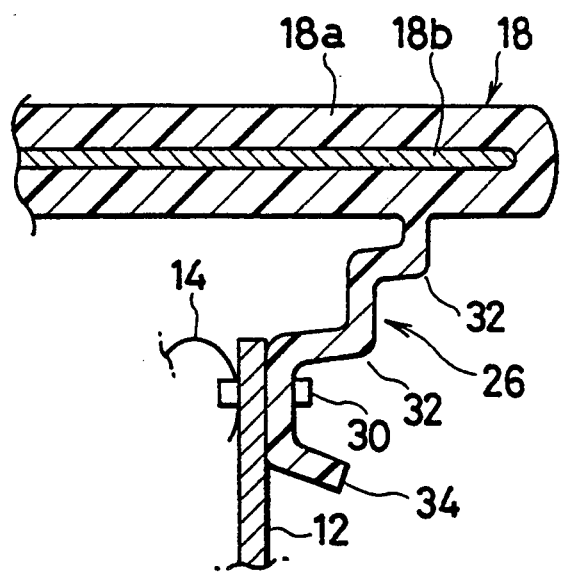
FIG. 2 is a cross section showing a major part of a structure of another embodiment of the invention.

In the embodiments in FIGS. 2 and 3, the attachment piece 26 is provided along its tip edge with a rib 34, which increases the attaching strength between the attachment piece 26 and the casing 12. When the module cover 18 starts to open toward the cabin, the attachment piece 26 receives an extremely large force in a direction of removal of the attachment piece 26 from the casing 12. Provision of the rib 34 increases the strength of the tip end portion of the attachment portion 26, so that the attachment piece 26 is surely and reliably prevented from disengaging from the rivets or bolts.

Figure 7:
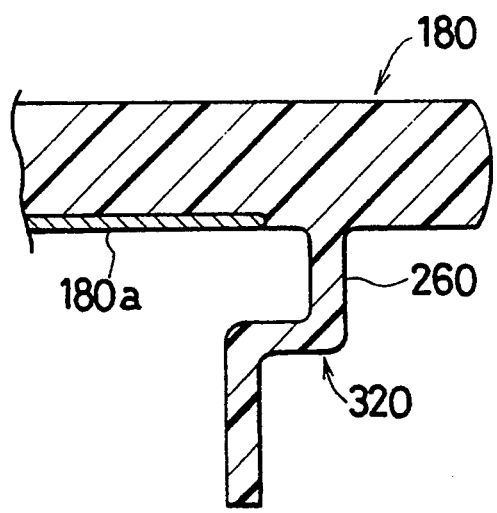
FIG. 7 is a cross section showing a major part of a module cover used in further another embodiment.

FIG. 7 shows a module cover 180, in which a reinforcement plate 180a is fixed onto a rear surface of a plate of the cover 180. An attachment piece 260 integrally formed of synthetic resin of the plate is provided with a bendable portion 320 having a crank-shaped section.

In the invention, the reinforcement plate is preferably made of metal, but may be made of synthetic resin or others. Wire or mesh may be used instead of the plate.

According to the module cover attaching structure of the invention, as described hereinabove, the module cover can open at a higher speed, and thus the air bag can develop at a higher speed into the cabin of the vehicle. Further, the inflator generating the gas at a small pressure can be used, and the cost thereof can be low.

What is claimed is:

1. A module cover attaching structure of an air bag device for a passenger, comprising:
   a casing for accommodating an air bag and having an opening at a front portion,
   a module cover having a plate for covering said opening of said casing and an edge portion around the plate located outside the opening of the casing when attached to the casing,
   a first attachment piece formed on a rear surface of said plate, said first attachment piece being fixed to the casing so that the first attachment piece disengages from the casing upon development of the air bag, and
   a second attachment piece being unconfined and formed on the rear surface of said plate at a side opposite to the first attachment piece, said second attachment piece having a flat first portion extending from the rear surface at a position near the edge portion to orient substantially perpendicularly to the rear surface, a second portion extending from the first portion in a direction away from the edge portion of the plate and bent relative to the first portion at about 90 degrees, and a third portion extending from the second portion and bent relative to the second portion at about 90 degrees to extend substantially parallel to the first portion, said third portion being fixed to the casing so that the second attachment piece can be easily bent upon inflation of the air bag, and the edge portion turns smoothly without being blocked by the casing.

2. A structure according to claim 1, wherein said plate of said module cover includes synthetic resin and a reinforcement member for reinforcing said synthetic resin, and said attachment pieces of said module cover are formed integrally with said synthetic resin of said plate.

3. A structure according to claim 1, wherein said second attachment piece is provided at its tip edge with a rib.

4. A structure according to claim 1, wherein said second portion of the second attachment piece includes two portions substantially parallel to each other and one portion situated between the two portions to form steps extending from the first portion to the third portion.

5. A module cover attaching structure of an air bag device for a passenger, comprising:
   a casing for accommodating an air bag and having an opening at a front portion,
   a module cover having a plate for covering said opening of said casing and an edge portion around the plate located outside the opening of the casing when attached to the casing,
   a first attachment piece formed on a rear surface of said plate, said first attachment piece being fixed to the casing so that the first attachment piece disengages from the casing upon development of the air bag, and
   a second attachment piece being unconfined and formed on the rear surface of said plate at a side opposite to the first attachment piece, said second attachment piece having a flat first portion extending from the rear surface at a position near the edge portion to orient substantially perpendicularly to the rear surface, a second portion extending from the first portion toward the edge portion and bent relative to the first portion at about 90 degrees, and a third portion extending from the second portion and bent relative to the second portion at about 90 degrees to extend substantially parallel to the first portion so that the third portion is located in a plane between the first portion and the edge portion, said third portion being fixed to the casing so that the second attachment piece can be easily bent upon inflation of the air bag, and the edge portion turns smoothly without being blocked by the casing.

* * * * *